June 2, 1953 W. K. MILLHOLLAND, JR 2,640,377
BORING MILL
Filed Aug. 1, 1951 6 Sheets-Sheet 3

INVENTOR,
WILLIAM K. MILLHOLLAND JR.
By Herbert A. Minturn,
ATTORNEY.

INVENTOR,
WILLIAM K. MILLHOLLAND JR.
By Herbert A. Minturn,
ATTORNEY.

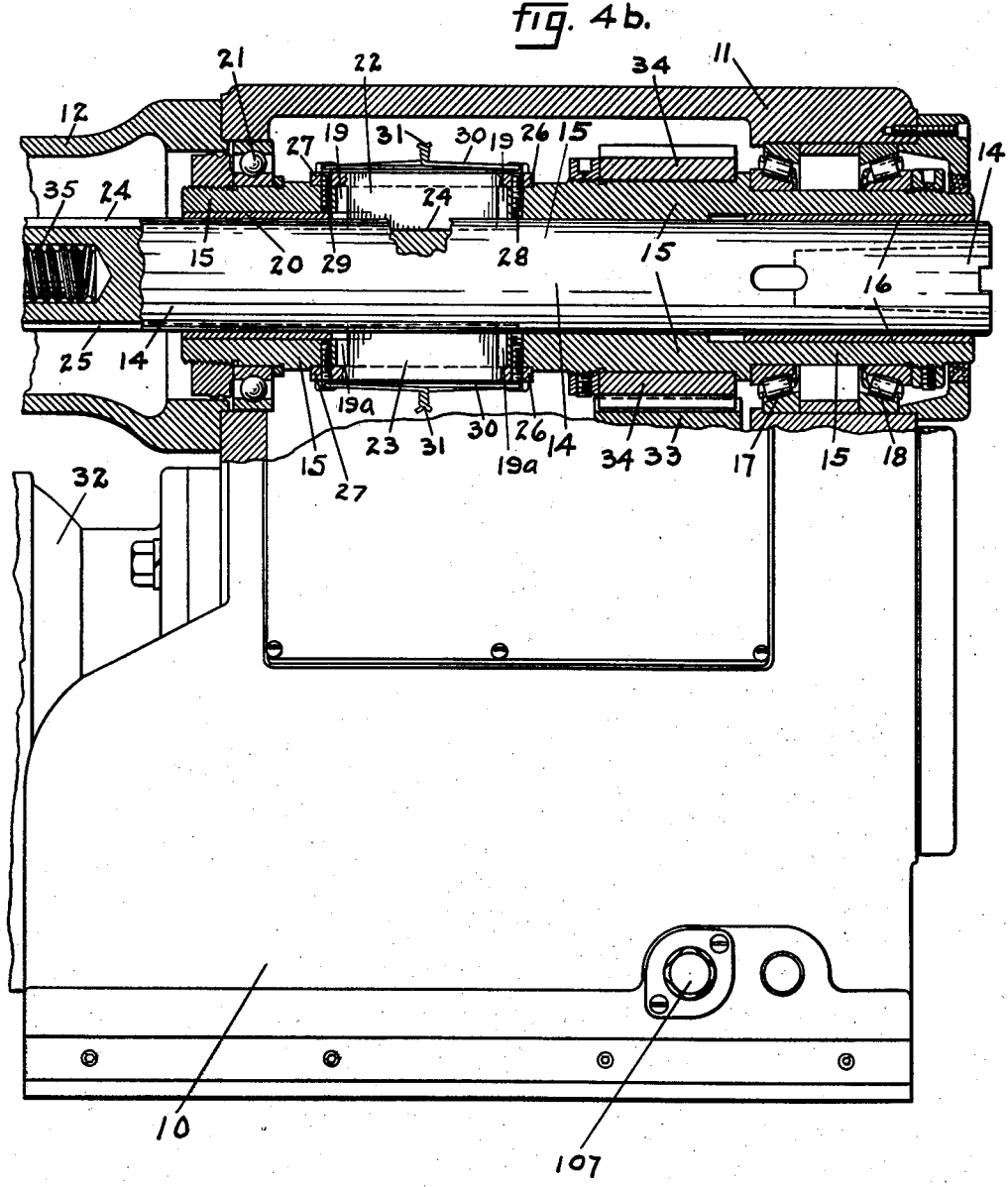

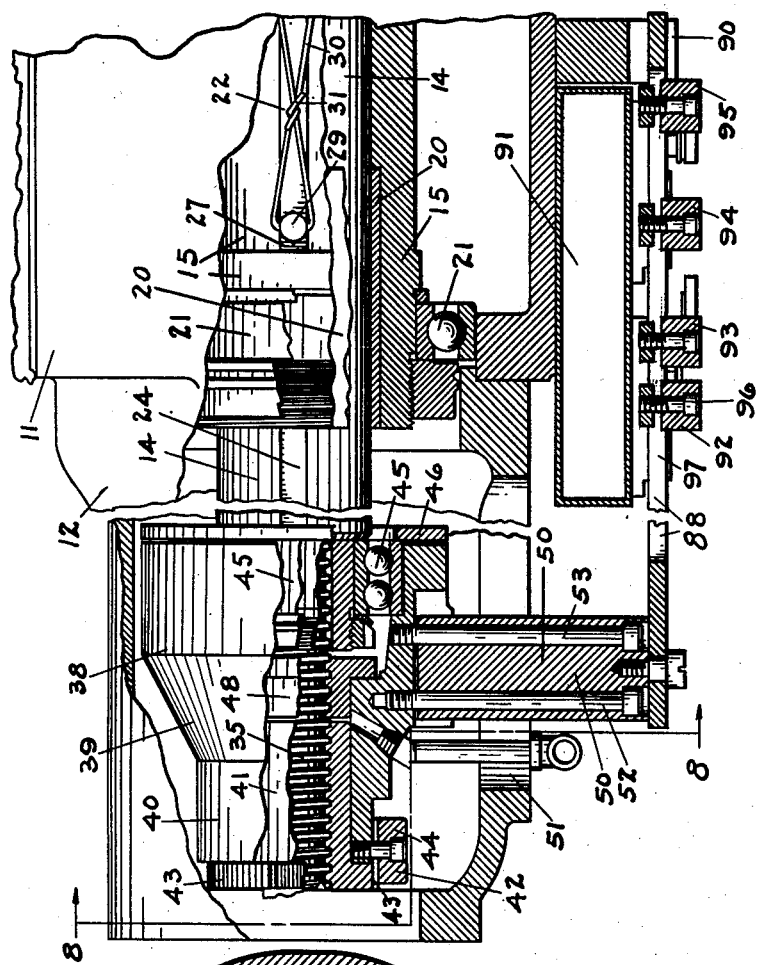
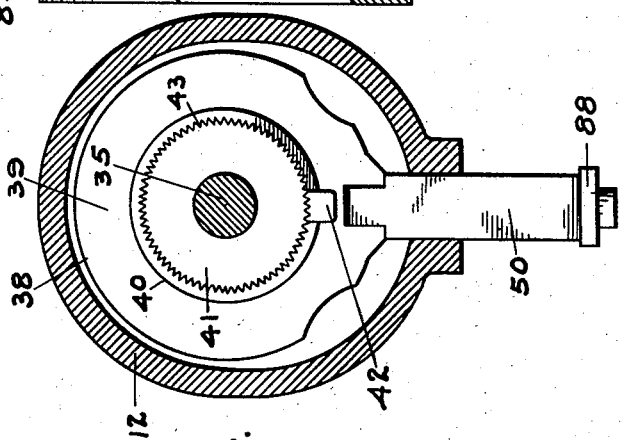

Patented June 2, 1953

2,640,377

UNITED STATES PATENT OFFICE 2,640,377

BORING MILL

William K. Millholland, Jr., Indianapolis, Ind.

Application August 1, 1951, Serial No. 239,743

3 Claims. (Cl. 77—3)

This invention relates to a boring mill and particularly to the head of a boring mill which may be hand adjusted into positions along ways of a bed. The invention particularly resides in the unique structure which permits a rotary drive of the tool boring bar and also which permits an automatic feed longitudinally of the bar within predetermined limits. The longitudinal feed is controlled automatically to very precise limits, this control feature being embodied in a structure forming a particular part of the invention.

The particular construction of the boring mill which enters into the present invention promotes a very quick set up for any particular operation and permits an extremely high degree of accuracy in the longitudinal travel of the bar. The machine may be set up for making a fast cut followed by a slow cut and may be automatically advanced and contracted in respect to the bar or within the plan of operation.

Furthermore the particular construction permits a very rugged design so that the machine will not only be free of undue vibration, but will remain usable and accurate over an extremely long period of time.

These and many other objects and advantages of the invention will become apparent to those skilled in the art in the following description of one particular form of the invention as illustrated in the accompanying drawings, in which Fig. 1 is a view in side elevation of a structure embodying the invention;

Fig. 4b is a view in side elevation and central section of the upper portion of the machine as a continuation of the view shown in Fig. 4a;

Fig. 7 is a detail in horizontal section on the line 7—7 in Fig. 1; and

Fig. 8 is a vertical section on the line 8—8 in Fig. 7.

Figure 1:
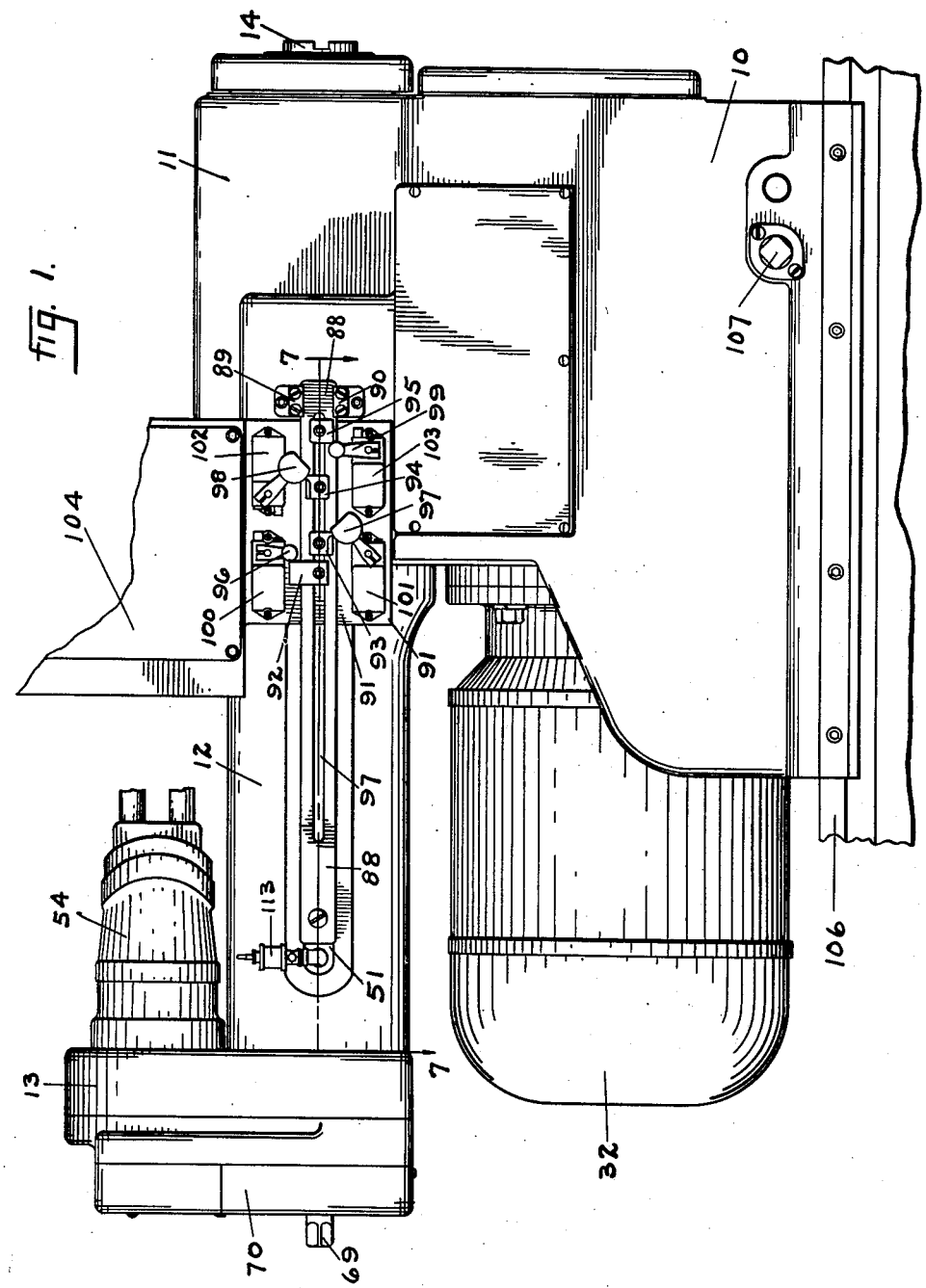

A base member 10 has formed on the upper side thereof a bar housing 11 and continuing from the back side of the housing 11 is a tubular housing 12, in turn carrying on the rear end a gear drive housing 13.

A bar 14 has a drive sleeve 15 fitted over its forward end portion, and through which sleeve 15 the bar 14 may travel longitudinally on a horizontal axis. This sleeve 15 is provided with a bearing bushing 16 fitted into its forward end portion. Externally of the sleeve 15 on its forward portion there is fitted a pair of radial and thrust roller bearings 17 and 18, in turn carried by the bar housing 11, Fig. 4b. The sleeve 15 extends rearwardly along the bar 14, and in its rear portion carries a bearing bushing 20 therewithin and through which the bar 14 may travel longitudinally. A ball bearing 21 is shown as being carried externally of the sleeve 15 and fitted within the housing 11 so that the bar 14 may turn with the sleeve 15 on the anti-friction bearings 17, 18, and 21.

Since the bar 14 is free to be carried longitudinally through the sleeve 15, the bearings 17 and 18 are so fitted in the housing 11 as to restrain the sleeve 15 from longitudinal travel relative to the housing 11.

The sleeve 15 is slotted on diametrical sides forwardly of the bearing 21 to provide the slots 19 and 19a, through which keys 22 and 23 engage slidingly within keyways 24 and 25 extending longitudinally along the bar 14 on diametrically opposed sides thereof. Each of these keys 22 and 23 is formed to have ears 26 and 27 extending over in lapping relation onto the sleeve 15 at the ends of their respective slots 19 and 19a, and the keys are fixed to the sleeve by means of the cap screws 28 and 29 extending through the ears and screw-threadedly engaging in the sleeve 15. Then as a matter of precaution, these screws 28 and 29 are held against loosening or turning by means of a wire 30 which is passed through their heads and twisted together by their ends 31 as indicated in Fig. 4b. The vertical height of the keys 22 and 23 is such in each instance that the keys will fit slidingly within the keyways 24 and 25 when the ears 26 and 27 are seated on the sleeve 15.

A drive motor 32 is attached to the rear side of the base 10, and this is the motor which revolves the bar 14 on its horizontal axis. Within the base 10 (not shown) is a train of reduction gears terminating in the final drive gear 33, Fig. 4b. A pinion gear 34 is fixed on the sleeve 15, Fig. 4b, and is in constant mesh with the gear 33. Thus the motor 32 may revolve the bar 14.

The bar 14 extends rearwardly in spaced relation throughout the major length of the housing 12, and freely telescopes over the forward end portion of a screw shaft 35. This shaft 35 is revolubly carried by the bearings 36 and 37 mounted on the rear and front sides respectively of the housing 13, Fig. 4a.

Within the housing 12 and forward of the bearing 37 there is a nut generally designated by the numeral 38. This nut 38 has an outer housing 39 with a rear cylindrical end portion 40 into which is fitted a screw-threaded sleeve 41. This sleeve 41 is fixed against rotation relative to the housing 39 by any suitable means, herein shown as by a block 42 which selectively is engageable with the teeth 43 which are formed circumferentially around a rear end of the sleeve 41, Figs. 4a, 7, and 8. This block 42 is secured in the selected position by means of a screw 44, screw-threadedly engaging in the cylindrical portion 40.

From the rear cylindrical portion 40, the housing 39 flares forwardly and outwardly to engage over the outer raceway of a thrust bearing 45 which is mounted on the rear end of the bar 14 and secured thereon against longitudinal displacement. An annular ring 46 extends over the forward side of the bearing 45 and is attached to the front end of the housing 38 by any suitable means such as by the screws 47. Thus the housing 39 is prevented from longitudinal travel independently of travel of the bar 14. In other words, the housing 39 is carried in longitudinal directions with the travel of the bar 14. A front bushing 48 is secured in the housing 39 between the front end of the bushing 41 and the rear end of the bar 14, this front bushing 48 being fixed to the housing by any suitable means such as by the screws 49. This front bushing 49 is screw threaded to receive the shaft 35 screw threadedly therethrough. By reason of the fact that the bushing 41 and the bushing 49 are in two separate parts, the rear bushing 41 has to be aligned with the bushing 48 which is fixed in the housing 39, and that is the reason for the use of the block 42 selectively engaging in the teeth 43 in order to position the bushing 41 at the proper degree of revolutions. This also permits taking up wear in the threads by turning the bushing 41 relative to the bushing 48.

In order to hold the nut 38 against rotation about the axis of the bar 14, there is provided a holding block 50 which extends in a sliding fit horizontally outwardly through a slot 51 provided along the housing 12. This block, Fig. 7, has its inner end mortised into the housing 39 and is attached and held in fixed engagement with the housing 39 by means of a pair of screws 52 and 53.

Figure 4A:
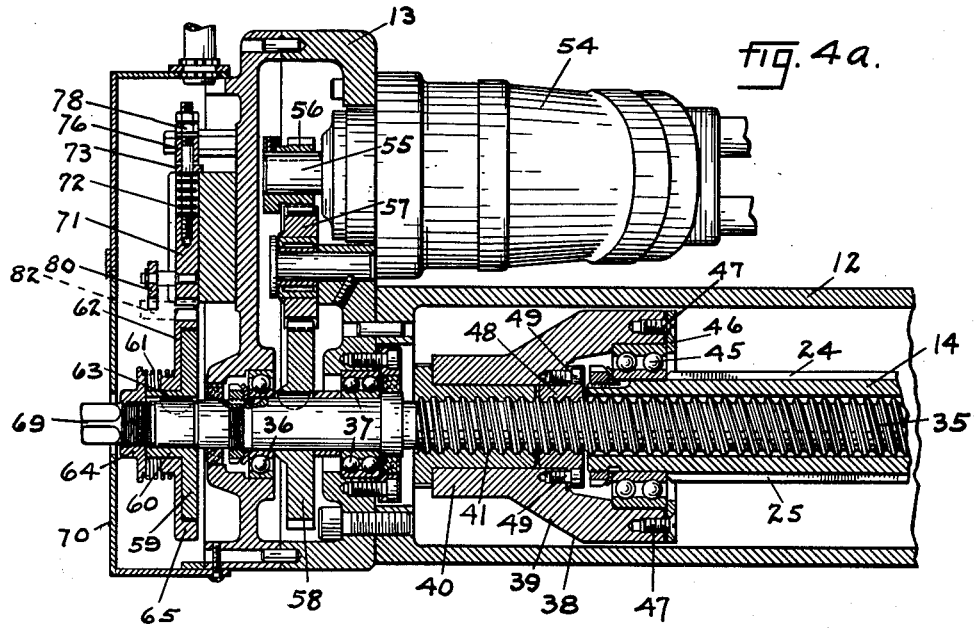
Fig. 4a is a view in vertical central section through the rear end portion of the machine.

A hydraulic motor 54, Fig. 4a, is mounted against the forward face and upper portion of the housing 13. This motor has a drive shaft 55 extending into the housing 13 to carry a pinion gear 56 in constant mesh with an idler gear 57 in turn constantly meshed with a driven gear 58 that is fixed on the shaft 35 between the bearings 36 and 37. Thus, when the motor 54 is operating, the shaft 35 is revolved to cause the nut 38 to travel therealong, and in turn to cause the bar 14 to travel likewise.

The shaft 35 extends rearwardly beyond the bearing 36 to carry thereon in fixed manner outside of the housing 13 a disc 59. The disc 59 being fixed to the shaft 35 revolves therewith. The disc 59 has a hub 60 extending rearwardly therefrom around the shaft 35, and a compression spring 61 is carried therearound to abut by one end against a plate 62 which fits by a hub portion 63 around the hub 60 and normally bears against the rear face of the disc 59. The other end of the spring 61 bears against a nut 64 which screw-threadedly engages around the shaft 35. The nut 64 is normally turned up against the outer end of the hub 60 so as to retain the disc 59 in fixed longitudinal position on the shaft 35. By means of this construction, the plate 62 may be shifted rearwardly out of contact with the disc 59, that is the plate 62 is shifted against the yielding resistance of the spring 61.

Figures 5, 6:
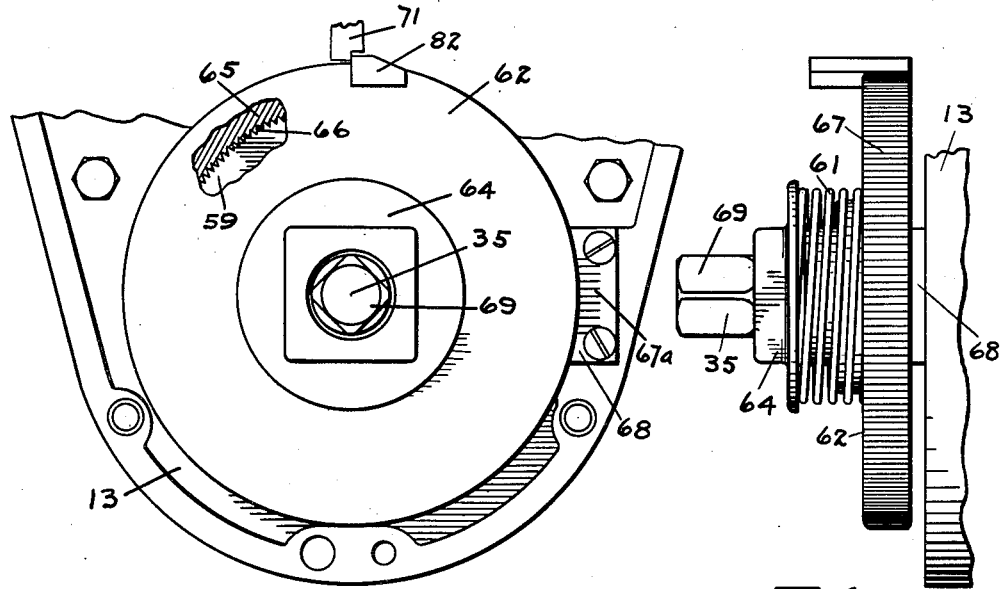
Fig. 5 is a detail in end elevation of the micrometer adjustment for longitudinal feeding.
Fig. 6 is a view in side elevation of the structure shown in Fig. 5.

The plate 62 has an annular forwardly extending flange 65 which telescopes over the periphery of the plate 59. The plate 59 is provided with a plurality of closely spaced transversely positioned teeth 66 entirely around its circumference. The inside of the flange 65 is likewise provided with matching teeth to engage and fit snugly between the teeth 66, Fig. 5. By retracting the plate 62 from the disc 59, the plate 62 may be revolved in relation to the disc 59 and then return to bear thereagainst with the teeth therebetween interengaging in different relations. That is, the plate 62 may be selectively positioned circumferentially around the plate 59 in any selected angular position. As a means for readily determining the angular relationship between the plate 62 and the disc 59, the peripheral face 66 of the plate 62 is provided with indexing marks 67 spaced apart circumferentially at distances corresponding to the spacing of the teeth 66. Then fixed on the side of the housing 13 is a plate 68 which is provided with indexing marks 67a. Thus the relative positions of the lines 67 and 67a may be observed in making the relative adjustments between the plate 62 and the disc 59. For convenience in the initial set up of a job, the shaft 35 is provided with an end 69, herein shown as squared so that a wrench or crank may be detachably engaged therewith as a means for revolving the shaft 35. A cover 70 is fitted over the back face of the housing 13 to enclose the nut 64 and the plate 62.

Figure 2:
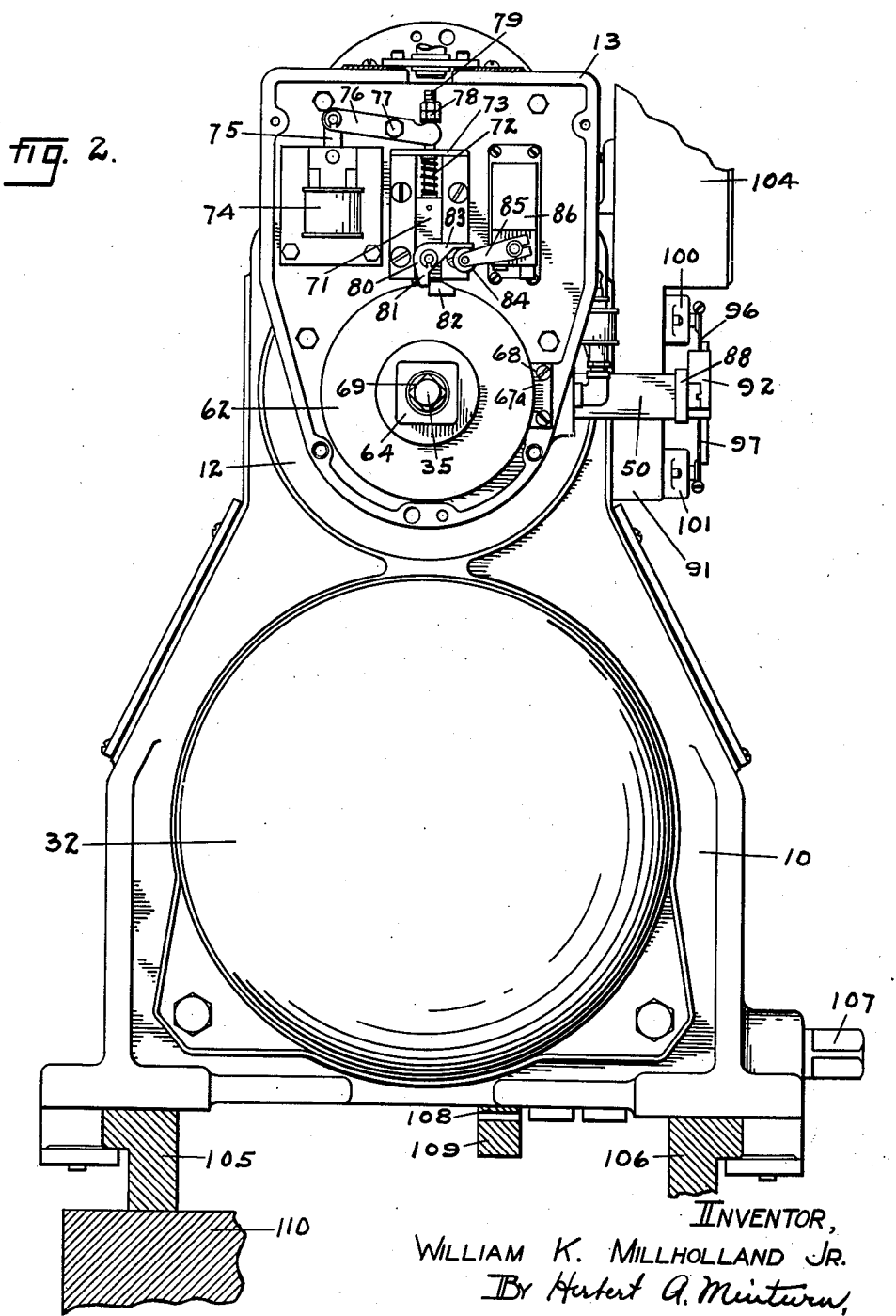
Fig. 2 is a view in rear end elevation.
Figure 3:
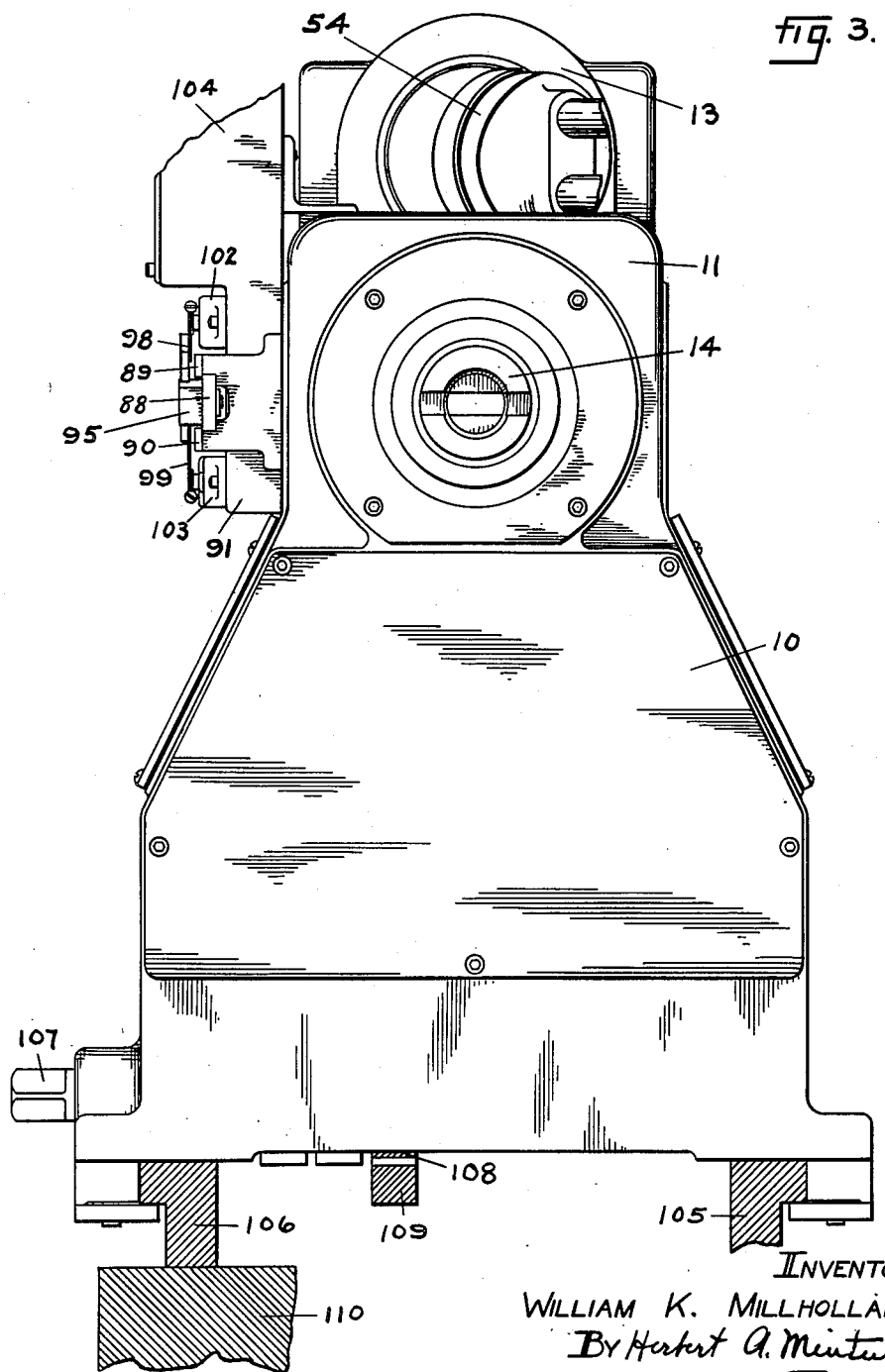
Fig. 3 is a view in front end elevation.

Mounted above the plate 62 is a slide 71 vertically guided and normally carried to a lowermost position by means of a compression spring 72 bearing between an upper stop plate 73 and the top side of the slide 71, Fig. 2. A solenoid 74 is mounted to one side of the cross slide 71 and has its armature 75 rockably engaged to a lever 76 pivoted on the cap screw 77, to have an outer free end presented underneath a nut 78 carried on the upper end of the stem 79 which extends upwardly from the slide 71 through the upper plate 73. When energized, the solenoid 74 rocks the lever 76 to lift the slide 71.

A bell crank lever 80 is pivoted on the slide 71 to have an arm 81 extend normally downwardly to be in the path of a stop 82 which is fixed on the plate 62 to extend into the path of that arm. The other arm 83 of the crank 80 extends substantially horizontally (when the slide 71 is in its lowermost position) over the top of a roller 84 which is mounted in the end of the arm 85 in turn connected to a switch 86.

When the slide 71 is dropped downwardly, the lower end will be in the path of the stop 82 so as to stop the turning of the plate 62 instantly (the motor 54 having been automatically stopped) and also the switch arm 85 has been operated to affect a circuit entering into the overall control system.

The block 50 which is attached to the nut 38 and which extends through the slot 51 extends beyond the wall of the housing 12 a distance, Fig. 7, and has fixed on its outer end a timing control bar 88. This bar 88, Fig. 1, extends horizontally along the housing 12 to have its forward end guided in a sliding manner between the upper and lower guide blocks 89 and 90 respectively. The control bar 88 is spaced outwardly, laterally from a switch mounting box 91. On the bar 88, there are secured a number of stops, herein shown as four in number and designated by the numerals 92, 93, 94, and 95. These stops are adjustably secured along the bar 88 by bolts 96, Fig. 7, which extends through the stops and through the central horizontal slot 97 which extends through the major length of the bar 88. Into the paths of these stops 92, 93, 94, and 95 there are carried operating arms 96, 97, 98, and 99 of respective electric switches 100, 101, 102, and 103. These switches are mounted on the box 91.

The box 91 is used simply to contain the wires leading from those respective switches, and from that box 91, the wires lead into the main control box 104 mounted thereabove. The control system as is operated by these various limit switches 100–103 inclusive does not constitute any part of the present invention per se, and hence the control circuits are not shown or described. It is sufficient to state that these circuits operate to control valves controlling flow of fluids to and from the hydraulic motor 54, in the usual and well known manner.

The entire mill is mounted preferably to slide along ways 105 and 106, Fig. 2, and the mill is rapidly carried to the approximate position desired by means of turning a side shaft 107 by any suitable means such as by a crank (not shown), this crank in turn turning a spur gear 108 which is in constant mesh with a rack bar 109 held stationary by the bed 110.

In operation, in the original set-up for the production job, the entire mill is adjusted along the ways 105 and 106 to the approximate position. Then by preliminary travel of the bar 14, the stops 92—95 are adjusted along the bar 88 to be in the correct positions for operation of the respective switches 100—103 for the required control. The final micrometer adjustment for depth of the cut, that is effected by the advance of the bar 14, is made through the relative interconnection between the plate 62 and the disk 59. This interadjustment as above described is made so that when the proper limit switch, one of the switches 100—103, is operated, the solenoid 74 will respond thereto, to drop the slide 71 into the path of the abutment 82 and instantaneously stop the rotation of the shaft 35, also instantaneously causing the crank 80 to actuate the arm 85 of the switch 86 which in turn stops travel of the hydraulic motor 54. That is the switch 86 is a motor stop switch and the solenoid 74 is a slide release device so that there is precise stoppage of rotation of the shaft 34 to effect the depth of a cut within a very close tolerance.

Advantage is taken of the fact that the nut 38 does not revolve in respect to the shaft 35 or the bore 13, and that a lubricating pipe 112 may be carried through the slot 51 to engage the side of the nut so that lubrication may be fed from a lubricator 113 through the pipe 112 through the passageway 114 into the central portion of the nut between the members 41 and 48.

While I have herein shown and described my invention in the one particular form, it is obvious that structural variations may be employed without departing from the spirit of the invention, and I therefore do not desire to be limited to that precise form beyond the limitations which may be imposed by the following claims.

I claim:

1. In a boring mill, the combination of a housing; a bar revolubly and longitudinally shiftable in respect to the housing; motor means revolving the bar; a screw-shaft for longitudinally shifting the bar; motor means revolving said shaft; a disk fixed to said shaft to revolve therewith; a plate longitudinally slidable along said shaft; spring means yieldingly urging said plate toward said disk; an annular flange on said plate telescoping over the periphery of said disk, said flange and said periphery being respectively toothed for selective circumferential interengagement maintained by said spring; an abutment carried by and externally of said plate; a slide carried by said housing to be reciprocable into and out of the path of said abutment; means yieldingly retaining the slide in said path; electro-magnet means normally energized to withhold said slide from said path in opposition to said spring; a screw-shaft motor means control switch arm; a rocker member pivotally mounted on said slide to have one portion in the path of said arm and another portion in the path of said abutment to shift said arm upon abutment travel thereagainst to stop said shaft motor means; and means actuated by longitudinal travel of said bar to deenergize said electro-magnet means to have said slide stop instantaneously revolution of said screw shaft by said abutment striking said slide.

2. For controlling precise limits of travel of a boring tool in a boring mill, the combination of a tool carrying bar; a motor for revolving the bar; a screw-shaft interconnecting with the bar to set up longitudinal travel thereof; a motor driving said shaft; an abutment carried by said shaft adjustably positioned circumferentially therearound; a slide carried by said mill guided to reciprocate into and out of the path of said abutment; yielding means normally maintaining said slide to be in said path; a bar revolving motor control switch arm; a rocker carried by said slide to be in the path of both said abutment and said arm when the slide is moved into said abutment path, said arm being biased by said abutment through said rocker to a motor deenergized position; electro-magnet means normally energized for shifting said slide in opposition to said yielding means to hold said slide and said rocker out of the path of said abutment; and switch means actuated by longitudinal travel of said bar to deenergize said electro-magnet means.

3. A boring mill control comprising a tool bar; a motor to revolve the bar; a screw-shaft to shift the bar longitudinally; a second motor to turn said screw-shaft; an abutment carried by said shaft; a control actuated by a predetermined longitudinal travel of said bar; a member normally directed into the path of said abutment to stop turn of said shaft; normally energized electro-magnetic means withholding said member from said path; said control deenergizing said electro-magnetic means upon said shaft travel to permit said member to stop turning of said shaft; a shaft drive motor control arm; a member carried by said first member when in said abutment path to be also in said abutment path and in the path of said arm to arrest said shaft motor from turning of the shaft.

WILLIAM K. MILLHOLLAND, Jr.

References Cited in the file of this patent

UNITED STATES PATENTS

| Number | Name | Date |
|---|---|---|
| 461,202 | Pentz | Oct. 13, 1891 |
| 1,929,814 | Fairbairn et al. | Oct. 10, 1933 |
| 2,110,537 | Tautz | Mar. 8, 1938 |
| 2,358,954 | Verderber | Sept. 26, 1944 |
| 2,519,117 | Curtis | Aug. 15, 1950 |